Dec. 8, 1925.
L. ROGET
SAW GUIDE
Filed Nov. 6, 1924
1,564,448
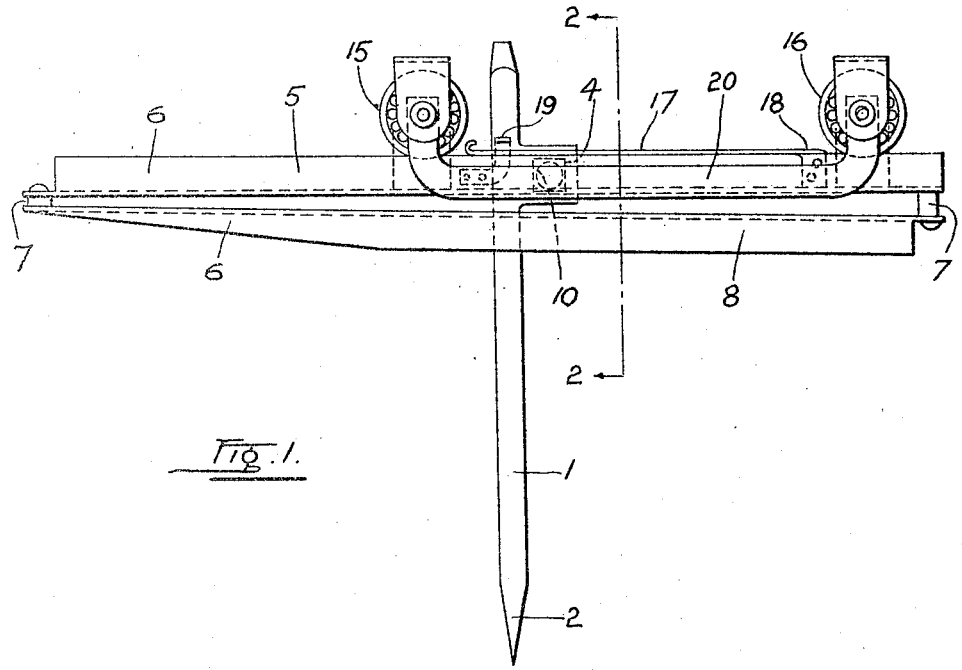
Fig. 1.
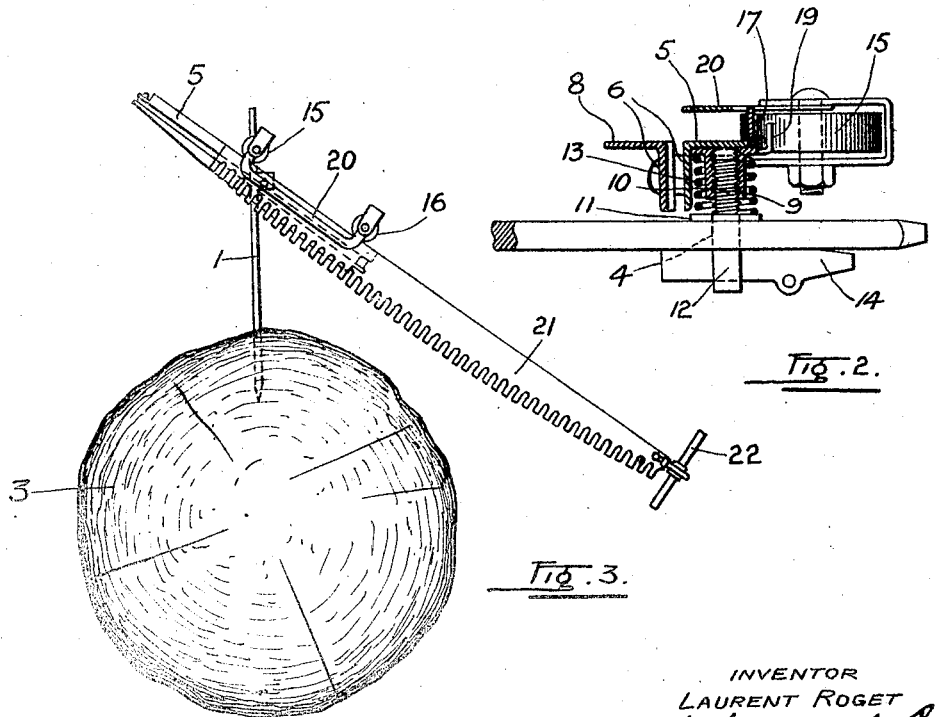
Fig. 2.
Fig. 3.
INVENTOR
LAURENT ROGET
BY  *Fetherstonhaugh & Co*
ATTORNEYS Patented Dec. 8, 1925.

1,564,448

UNITED STATES PATENT OFFICE.

LAURENT ROGET, OF STAVE FALLS, BRITISH COLUMBIA, CANADA.

SAW GUIDE.

Application filed November 6, 1924. Serial No. 748,147.

*To all whom it may concern:*

Be it known that I, LAURENT ROGET, a citizen of France, and a resident of Stave Falls, in the Province of British Columbia, Canada, have invented certain new and useful Improvements in Saw Guides, of which the following is a specification.

My invention relates to improvements in saw guides the objects of which are first to provide a rest upon which the outer end of a saw may be carried and guided when making a horizontal cut therewith, second to enable a single sawyer to use conveniently and efficiently a long cross cut saw for falling trees, and third to enable the sawyer to impart a suitable pressure to the back edge of the saw both at the handle and at points adjacent the outer end thereof.

The invention consists essentially of a pivotally mounted guide supported away from the tree, which is adapted to guide the saw in its to and fro movement and to turn about its pivot as the cut of the saw extends from one side of the tree to the other, as will be more particularly described in the following specification, in which:—

Figure 1 is a plan view of my invention.

Figure 2 is a sectional view taken on the line 2—2 of Figure 1.

Figure 3 is a plan view showing the use of my device in falling a tree.

In the drawings like characters of reference indicate corresponding parts in each figure.

The numeral 1 indicates an elongated support pointed at one end as at 2 by which it is driven horizontally into the tree 3 (see Fig. 3). Adjacent the outer end of the support a rectangular aperture 4, shown in dotted lines in Fig. 1, is provided to receive the pivotal member of the guide 5. The guide 5 is preferably formed with a pair of angle iron members 6 spaced apart by separators 7 so as to form a relatively broad bed 8 upon which the side of the saw may slide. An internally threaded sleeve 9 is secured to the underside of the guide 5 into which a bolt 10 is fitted; the bolt is provided with a bearing flange 11 and a square shank 12 which is adapted to fit the aperture 4 of the support 1.

The numeral 13 indicates a coil spring surrounding the sleeve 9 and bearing at its lower end upon the flange 11 for the purpose of providing an adjustable resistance to the turning of the guide about the bolt. The numeral 14 indicates a key which is fitted through the shank of the bolt 10 to hold it in position in the aperture 4 of the support 1. Mounted intermediately of the length of the guide and also adjacent one end thereof is a pair of horizontally disposed ball bearing rollers 15 and 16 against the periphery of which the back edge of the saw engages in its movement along the guide. These rollers are carried by suitable shafts journaled in the arms of U-shaped brackets 16$^a$, the lower arms of which are fastened to the guide 5 as indicated by dotted lines in Figure 1. A spring guard 17 is connected to the guide adjacent the roller 16 as at 18. A stop 19 is provided adjacent the free end of the spring 17 to limit its outward movement so that in the event of the outer end of the saw being withdrawn beyond the roller 15 it will be directed back thereonto on the return stroke of the saw.

The numeral 20 indicates a flat strip of metal secured to the upper arms of the aforesaid brackets 16$^a$ supported above the guide 5 for the purpose of preventing the rear edge of the saw from lifting above the periphery of the rollers. The numeral 21 (see Fig. 3) indicates a cross cut saw having a handle 22.

Having thus described the several parts of my invention I will now briefly explain its use.

The support 1 is horizontally driven into the side of the tree and the guide 5 is fitted to the support and secured in place by inserting the key 14 through the bolt shank 12, the blade of the saw 21 is rested horizontally upon the members 6 of the guide, with its rear edge in rolling contact with the rollers 15 and 16, the handle 22 of the saw is brought towards the tree and the saw reciprocated against it. The pressure applied to the handle in the direction of the cut produces a reverse pressure at the outer end of the saw which is received mainly by the roller 15 and as the cut deepens, causes the guide to turn about its pivotal point, the bolt 10, so that the outer end of the saw is well supported throughout the entire cut.

It will thus be seen that I have invented a guide which will enable a sawyer to operate a saw with ease and which will permit of pressure being brought to bear as required throughout the entire length of the saw.

What I claim as my invention is:

1. The combination with a saw, of a support, a guide member pivotally mounted upon the support, spaced rollers carried by the guide member for engaging the back of the saw and resilient means extending between the rollers for guiding the end of the saw from one roller to another.

2. A device of the character described comprising a saw support consisting of a pair of horizontally disposed plates having their upper surfaces lying in the same plane and formed at their inner edges with depending flanges suitably secured together, means carried by said support for guiding the movement of a saw blade thereon and means pivotally connected with said support for attaching same to the trunk of a tree.

3. A device of the character described comprising a saw support, a pair of rollers carried by and spaced longitudinally of said support, and a straight edge guide element carried by said support and extending between said rollers, said element serving as a guide for the back edge of the saw and as a means for preventing the free end of the saw blade from being caught between the rollers.

4. A device of the character described comprising a saw support, a pair of rollers carried by and spaced longitudinally of said support and a flat resilient strip extending approximately the full length of the space between said rollers and having one end attached to the support.

5. A device of the character described comprising a saw support, a pair of U-shaped bracket members spaced longitudinally of said support with the lower arm of each bracket member secured to the support and the other arm of the bracket member positioned above the support, a roller journalled between the arm of each support and a flat strip secured to the support and extending between the rollers to prevent the saw blade from being caught therebetween.

6. The combination with the structure recited in claim 5 of a flat strip overlying the support and attached to the upper arms of said brackets, said strip serving to limit vertical movement of the saw blade with respect to the support.

7. A device of the character described comprising a saw support, means carried by said support for guiding the movement of a saw blade thereon, means pivotally connected with said support for attaching same to the trunk of a tree, and a spring connected between the support and the attaching means at the said pivot and serving to resist turning movement of the support in either direction with respect to the attaching means.

Dated at Vancouver, B. C., this 11th day of October, 1924.

LAURENT ROGET.